(12) United States Patent
Hogan et al.

(10) Patent No.: US 9,509,466 B2
(45) Date of Patent: Nov. 29, 2016

(54) OVERLAPPING SUB-CHANNELS IN A NETWORK

(75) Inventors: Thomas Hogan, Kennebunk, ME (US); Jeongkeun Lee, Mountain View, CA (US); Scott A. Lindsay, Providence, RI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/372,564

(22) PCT Filed: Apr. 27, 2012

(86) PCT No.: PCT/US2012/035517
§ 371 (c)(1),
(2), (4) Date: Jul. 16, 2014

(87) PCT Pub. No.: WO2013/162601
PCT Pub. Date: Oct. 31, 2013

(65) Prior Publication Data
US 2015/0098398 A1    Apr. 9, 2015

(51) Int. Cl.
*H04W 4/00* (2009.01)
*H04J 3/17* (2006.01)
*H04L 5/00* (2006.01)
*H04W 16/12* (2009.01)
*H04W 84/12* (2009.01)

(52) U.S. Cl.
CPC ............ *H04L 5/0044* (2013.01); *H04W 16/12* (2013.01); *H04W 84/12* (2013.01)

(58) Field of Classification Search
CPC ..... H04W 4/00; H04W 72/00; H04W 84/12; H04W 28/16; H04L 1/00
See application file for complete search history.

(56) References Cited

U.S. PATENT DOCUMENTS

| 6,553,234 | B1 | 4/2003 | Florea |
| 7,474,895 | B1 | 1/2009 | Jiang et al. |
| 7,751,822 | B2 | 7/2010 | Hyslop et al. |
| 8,879,527 | B1* | 11/2014 | Venkatesh ............... H04W 4/00 370/338 |
| 2004/0259556 | A1 | 12/2004 | Czys |
| 2005/0250503 | A1 | 11/2005 | Cutrer |
| 2009/0116444 | A1 | 5/2009 | Wang et al. |
| 2011/0299417 | A1 | 12/2011 | Sanjiv et al. |

FOREIGN PATENT DOCUMENTS

WO    WO-2011098298 A2    8/2011

* cited by examiner

*Primary Examiner* — Melanie Jagannathan
(74) *Attorney, Agent, or Firm* — Hewlett Packard Enterprise Patent Department (57) ABSTRACT

In a network, a first network station (61) communicates with a second network station (65) using a first channel (45) from a plurality of channels. The first channel (45) has a central frequency (46). A third network station (62) communicates using a sub-channel (55) of the first channel (45). The sub-channel overlaps the first channel (45). The sub-channel (55) has a center frequency (56) that varies sufficiently from the center frequency (46) of the first channel (45) so that the first network station (61) and the second network station (65) do not lock onto packets transmitted from the third network station (62). The center frequency (56) of the sub-channel (55) is closer in frequency to the center frequency (46) of the first channel (45) than to a center frequency of any other channel in the plurality of channels.

9 Claims, 6 Drawing Sheets

OVERLAPPING SUB-CHANNELS IN A NETWORK

BACKGROUND

Wireless local area network (WLAN) products based on the Institute of Electrical and Electronics Engineers' (IEEE) 802.11 standards are often referred to as Wi-Fi technology. All devices that are connected via a WLAN are referred to as stations or network stations. All network stations are equipped with wireless network interface controllers (WNICs). Network stations are either access points or clients. Access points (APs), typically routers, are base stations for a WLAN. Clients are devices such as personal computers, video game consoles, smartphones, tablet computers, digital audio players and wireless sensor devices.

WLAN operating according to the IEEE 802.11 standards use Carrier Sense Multiple Access/Collision Avoidance (CSMA/CA) that attempts to avoid collisions between transmissions. Under CSMA/CA, when a device needs to transmit, it listens to the network (senses the carrier) and waits for it to be free before beginning a transmission.

When two WLANs are in close proximity, transmission interference between the two WLANs can be avoided by each transmitting on different channels. For example, IEEE 802.11a operates in the 5 GHz band and has 22 or 23 non-overlapping channels. IEEE 802.11g is divided into 13 channels spaced 5 MHz apart, with channel 1 centered on 2.412 GHz and channel 13 centered on 2.472 GHz. IEEE 802.11g uses 20 MHz width signals allowing for four non-overlapping channels. IEEE 802.11n operates both on the 2.4 GHz band and on the 5 GHz band. Availability of channels is regulated by country. In North America, for example, only channels 1 through 11 are currently allowed to be used.

The IEEE 802.11a/g/n standards use orthogonal frequency-division multiplexing (OFDM) and define a preamble used to acquire frequency, phase and symbol timing. The beginning of this preamble consists of a sequence of eight repeated symbols used for, among other things, coarse frequency acquisition. The symbols transmitted during the beginning of the preamble employ fewer subcarriers than are used during normal data transmission in order to make for wider subcarrier spacing in order to allow the receiving station to acquire frequency lock over a wider range of frequency offsets between transmitting station and receiving station.

DETAILED DESCRIPTION

Communications between two network stations can be disrupted when another network station, located a distance away, is transmitting on a same channel. In the IEEE 802.11 standards, network stations, such as access points and clients, utilize signal strength to determine whether a received communication should be treated as a legitimate communication or interference from a distant transmitting station. For example, typical logic implemented by a WLAN chipset will treat a signal as potentially legitimate communication if the signal strength is above a threshold required for valid detection of a detect a preamble training sequence. When the signal strength is above the threshold, the network station is able to detect a preamble training sequence to recognize a start of a frame transmission.

Figure 1:
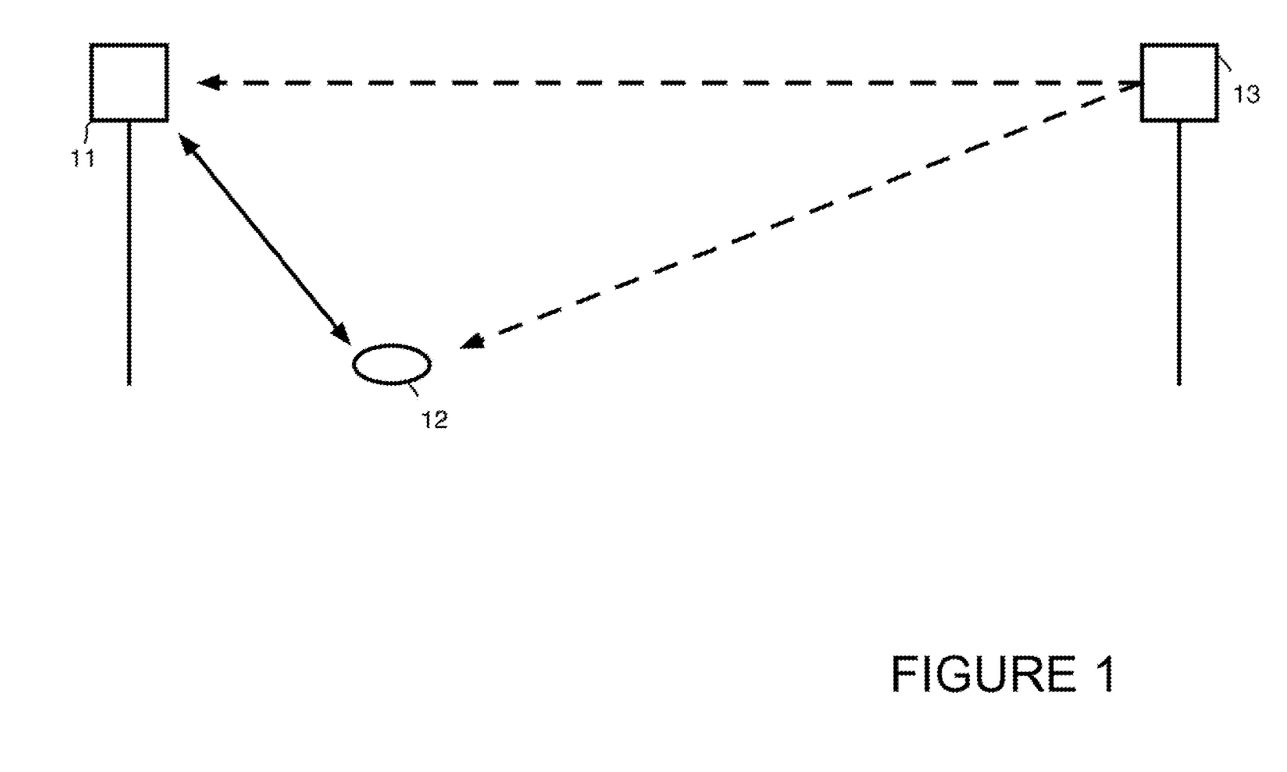
FIG. 1 is a simplified block diagram of a network where transmission from one network station is potentially interfering with communication between two other network stations, in accordance with an implementation.

This is illustrated in FIG. 1 where a network station 11, for example an access point in a WLAN, is communicating with a network station 12, for example a client in the same WLAN. Transmissions from a network station 13, for example an access point in a WLAN, when transmitting on a same channel as communication network station 11 and network station 12, may interfere with transmissions with communications between network station 11 and network station 12, provided the signal strength of signals received from network station 13 by network station 11 or network station 12 meets or exceeds the threshold at which network station 11 or network station 12 can communicate.

Under the IEEE 802.11 standard, when decoding a packet from one transmitting station, a receiving station will restart the packet acquisition phase when there is a significant increase in signal amplitude indicating a packet from a much nearer transmitting station is being send over the same channel. Upon receiving the signal with significantly increased amplitude, a network station will cease decoding the packet from the distant transmitting station and begin the process of decoding a new packet sent with the increased observed signal levels.

Figure 2:
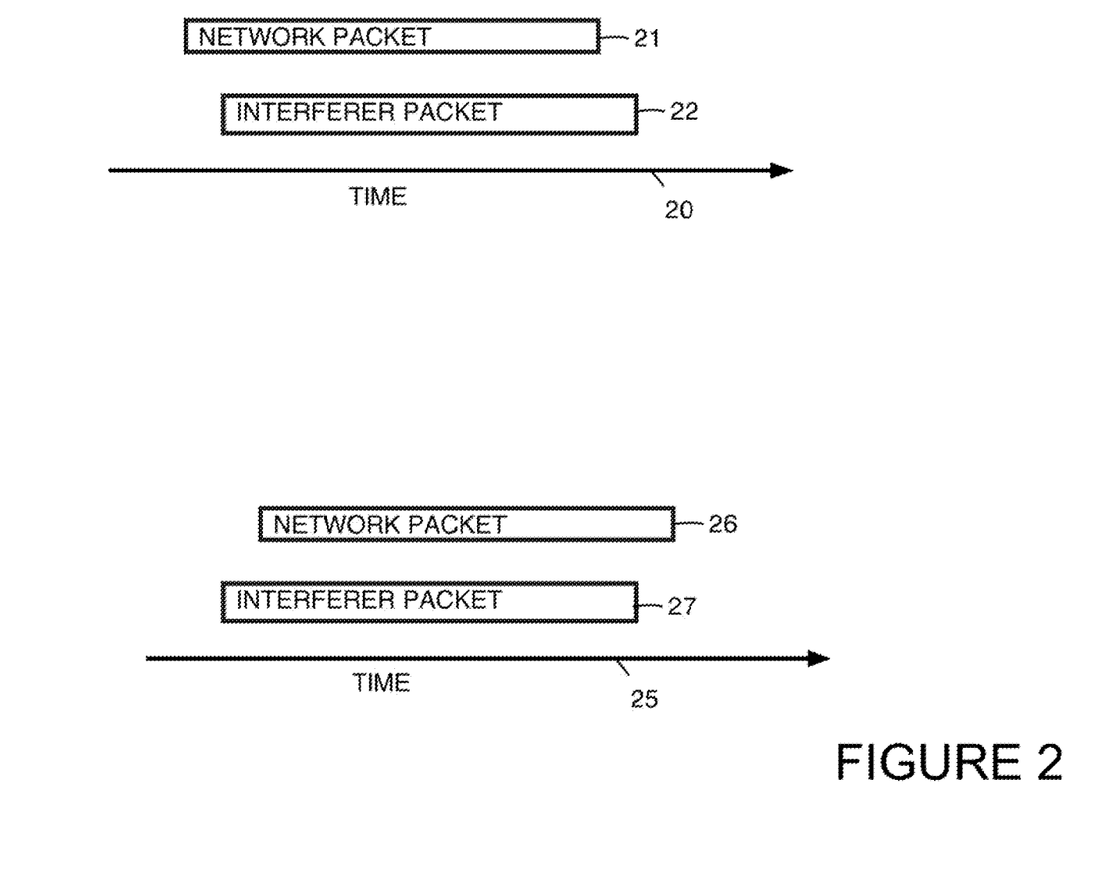
FIG. 2 shows simplified timing diagrams of signals where transmission from one network station is potentially interfering with communication between two other network stations, in accordance with an implementation.

When a network packet arrives before arrival of an interferer packet with a weaker signal amplitude, the receiving network station will be able to lock onto and acquire all of the network packet. This is illustrated in FIG. 2 where network packet 21 arrives before interferer packet 22, as time is shown to elapse by time line 20.

When a network packet arrives after an interferer packet, the signal used to transmit the network packet may need to be significantly (e.g., 11 to 15 dB) stronger than the signal used to transmit the interferer packet in order for the receiving network station to stop decoding the interferer packet and recover the network packet with a probability of error less than ten percent. This is illustrated in FIG. 2 where network packet 26 arrives after interferer packet 27 as time is shown to elapse by time line 25.

When there are a sufficient number of non-overlapping channels, the problem of interference can be addressed by having each access point for a WLAN use a different channel. When there are not enough channels to avoid the issue of interferer packets, sub-channels may be used as described below.

Figure 3:
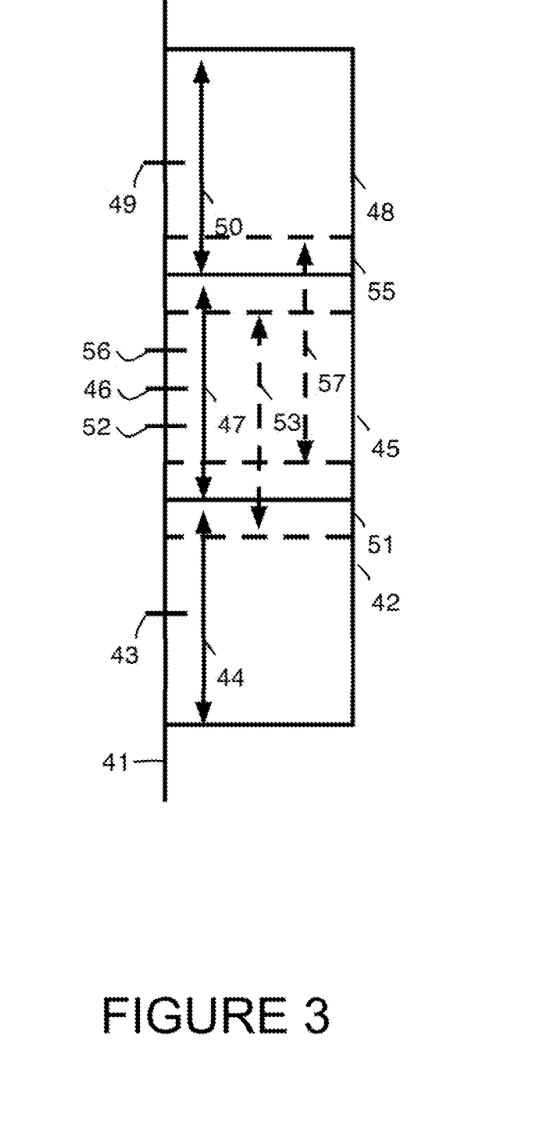
FIG. 3 is a simplified block diagram flow showing distribution of a channels and sub-channels, in accordance with an implementation.

FIG. 3 illustrates the use of sub-channels added to a band spectrum of non-overlapping channels. For example, FIG. 3 shows that along a frequency spectrum 41, a channel 42 has a center frequency 43 and a bandwidth 44 of, for example, 20 MHz. A channel 45 has a center frequency 46 and a bandwidth 47 of, for example, 20 MHz. A channel 48 has a center frequency 49 and a bandwidth 50 of, for example, 20 MHz.

FIG. 3 additionally shows two sub-channels, slightly offset from channel 45. A sub-channel 51 has a center frequency 52 and a bandwidth 53 of, for example, 20 MHz. A sub-channel 55 has a center frequency 56 and a bandwidth 57 of, for example, 20 MHz. Sub-channel 51 and sub-channel 52 are offset from channel 45 just sufficiently so that the preamble of packets sent in sub-channel 51 and sub-channel 52 are not detected by network stations communicating in channel 45.

For example, WLANs that operate in accordance with IEEE 802.11 a/g/n standards networks employ Orthogonal Frequency Division Multiplexing (OFDM) as a modulation scheme and define a preamble used to acquire frequency phase and symbol timing. The beginning of this preamble consists of a sequence of known repeated symbols used for among other things, coarse frequency acquisition. The symbols transmitted during the beginning of the preamble employ fewer subcarriers than are used during normal data transmission in order to make for wider subcarrier frequency spacing. This allows a receiving station to acquire frequency lock over a wider range of frequency offsets between transmitting station and receiving station.

Though the transmit format of the preamble is defined by the IEEE802.11 standard, the receiving station implementation is proprietary to an individual equipment vendor. Many vendor's coarse frequency acquisition algorithms have their basis in the work of Moose (IEEE Trans. Commun., vol. 42, no. 10, p. 2908-14, 1994). Such algorithms have a frequency acquisition range of +/− the frequency spacing between subcarriers, which for the standard 20 MHz wide channel with the standard IEEE802.11 preamble is +/−625 KHz. If a signal outside of this frequency offset is presented to a receiving station using a similar coarse frequency acquisition algorithm, such as proposed by Moose or any receive algorithm that limits its ability to lock onto a signal that exceeds a frequency offset limit, the receiving station will not acquire lock and will not regard the packet as valid. In the presence of a sufficiently frequency offset packet, the receiving station will continue to search for a valid packet to lock onto and will not regard the network as busy in the context of the CSMA/CA protocol.

In order for a transmitting station to prevent a receiving station from locking onto it by using a frequency offset, the transmitting station must guarantee a frequency offset of at least 625 KHz between transmitting station and receiving station. In order to guarantee this amount of offset, the transmitting station must account for the worst case difference between static frequency offset between transmitting station and receiving station due to frequency reference tolerances and the Doppler shift. With +/−25 parts per million (PPM) tolerance frequency references in both transmitting station and receiving station, the additional worst case required frequency shift at 2.4 GHz carrier frequency is 120 KHz. To account for the Doppler shift of a car moving at 60 MPH, an additional frequency offset of approximately 210 KHz is required. Therefore, in order to prevent a receiving station locking onto a transmitting station under worst case these conditions, a frequency offset of greater than approximately 955 khz is required.

Frequency adjustment of network stations can be used to achieve the at least 955 KHz frequency offset needed to provide partially overlapping channels. Such frequency adjustment can be accomplished by reprogramming a frequency synthesizer that provides a local oscillator used in up and down converters within a network station. Frequency adjustment of network stations can also be achieved by altering a master frequency reference of the network station.

In a basic service set (BSS) of a wireless LAN that operates in accordance with the IEEE 802.11 standards, a beacon frame packet is periodically transmitted by an access point. The beacon frame packet contains all the information about the network.

When adding WLANs that operate in sub-channels offset from a regularly assigned IEEE 802.11 channel, the access point for each channel can send out beacon frame packets in the sub-channel. For example, assume one WLAN operates on channel 40 with a center frequency at 5200 Mhz. Another nearby WLAN operates on a sub-channel (e.g., channel 40−) with a center frequency at 5199 Mhz. Another nearby WLAN operates on a sub-channel (e.g., channel 40+) with a center frequency at 5201 Mhz. The Access point for each WLAN periodically sends out a beacon frame packet containing information about its WLAN.

Figure 4:
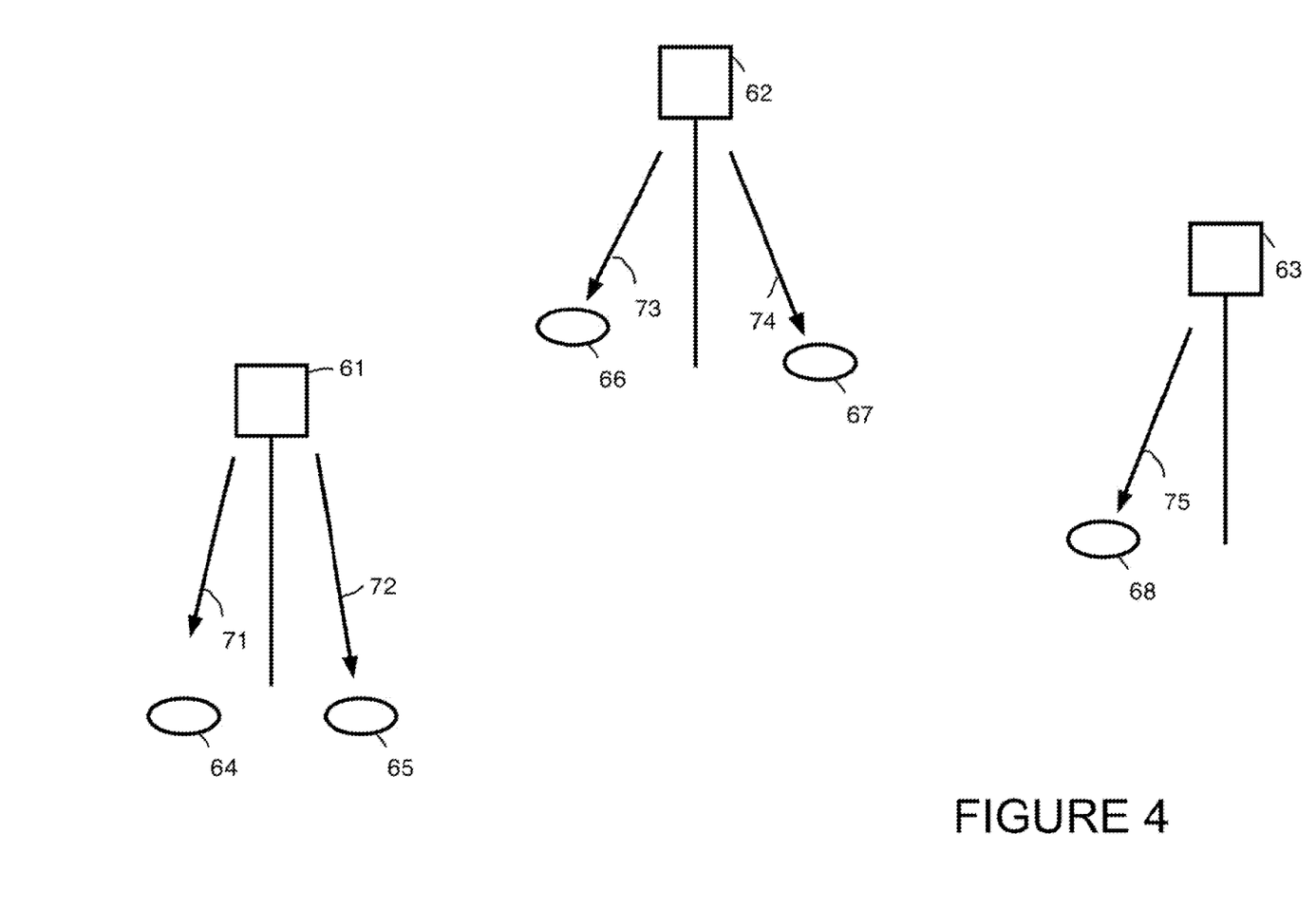
FIG. 4 shows three access points of a network, each broadcasting beacon frame packet, in accordance with an implementation.

This is illustrated in FIG. 4 where an access point 61 broadcasts a beacon frame packet, represented by an arrow 71 and an arrow 72, that is received by a client 64 and a client 65. An access point 62 broadcasts a beacon frame packet, represented by an arrow 73 and an arrow 74, that is received by a client 66 and a client 67. An access point 63 broadcasts a beacon frame packet, represented by an arrow 75, that is received by a client 68.

Figure 5:
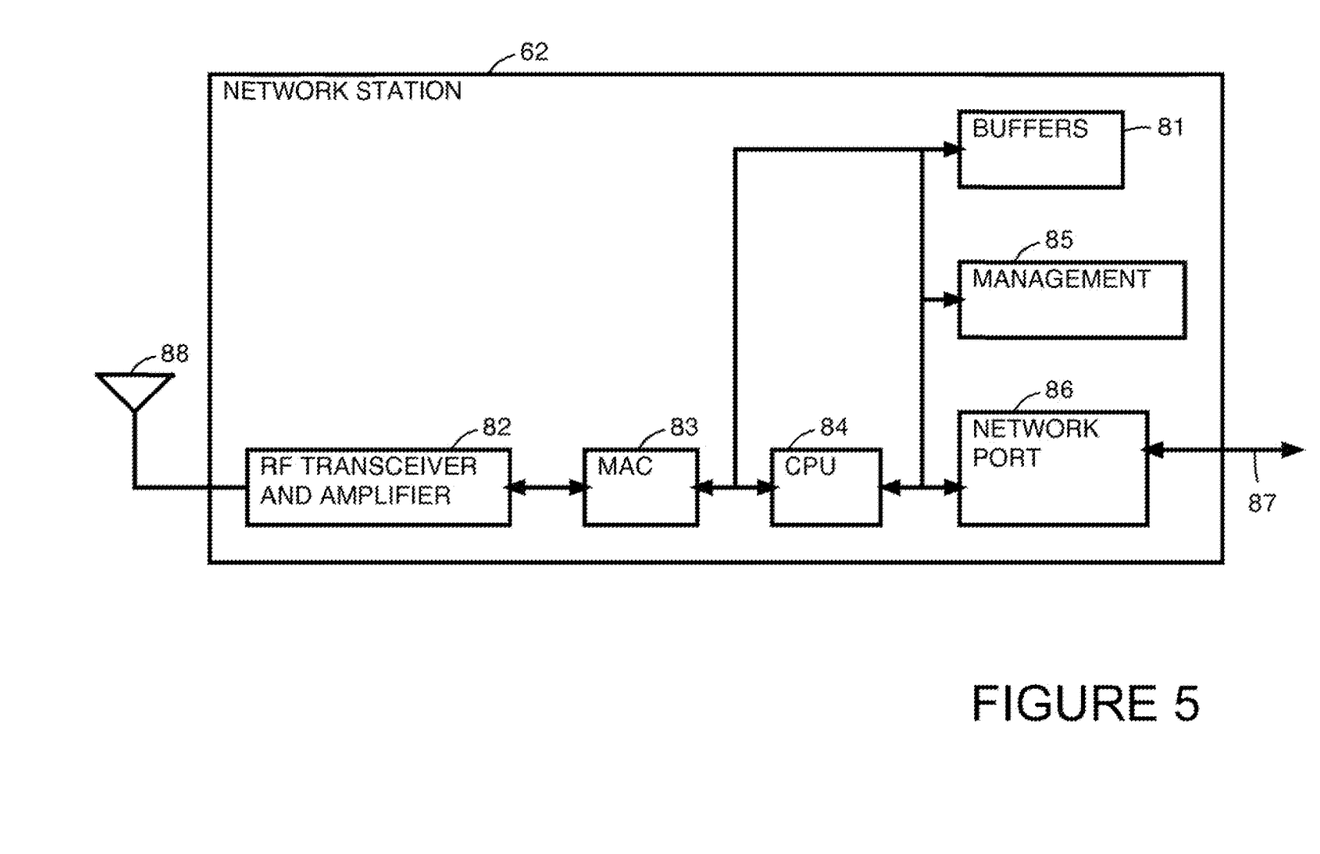
FIG. 5 is a simplified block diagram of a network station in accordance with an embodiment.

FIG. 5 shows a simplified block diagram of network station 62. Network station 62 includes buffers 81 for buffering data received and data to be sent. Management block 85 controls buffers 81. Network station 62 communicates with a wired network 87 through a network port 86. For example, wired network 87 operates in accordance with the Ethernet standards and network port includes functional blocks for the Ethernet media access control layer (MAC) and the Ethernet physical layer (PHY). Network station also includes a processor such as a central processing unit (CPU) 84 and includes a WLAN MAC 83. Network station 64 utilizes a radio frequency (RF) transceiver and amplifier 82 connected to an antenna 88 to send and receive signals when communicating with other network stations.

In order for each client to determine information about a network, including the transmission frequency, the client must listen for beacons on every possible channel or sub-channel an access point may broadcast a beacon. If there are, for example, a possibility of 10 channels and 20 sub-channels over which a beacon may be broadcast, then every client must listen for a beacon signal over 30 different frequency bandwidths.

In one implementation, a beacon is sent out only at channel center frequencies. Beacons are not sent out at sub-channel center frequencies. For example, suppose access point 61 communicates on channel 40 with a center frequency at 5200 MHz and a bandwidth of 20 MHz, access point 62 communicates on channel 40− with a center frequency at 5199 MHz and a bandwidth of 20 MHz and access point 63 communicates on channel 40+ with a center frequency at 5201 MHz and a bandwidth of 20 MHz. Each of access point 61, access point 62 and access point 63 sends out a beacon with a center frequency at 5200 MHz and with a 18 MHz bandwidth centered. The beacon will be within the 20 MHz receive bandwidth for each of channel 40, sub-channel 40− and sub-channel 40+. This makes it unnecessary for clients 64 through 68 to listen for beacons on sub-channels. Clients 64 through 68 need listen only for beacons at channel frequencies.

Because, in WLANs operating in accordance with 802.11 standards a receiving node will need to know the bandwidth of an incoming signal, a different preamble training sequence is used for the beacons transmitted at 18 MHz bandwidth. The preamble used for other 20 MHz bandwidth transmission will be in accordance with the IEEE 802.11 standard indicating the transmission has a 20 MHz bandwidth. A receiving node determines whether this is 18 MHz bandwidth beacon transmission or the original 20 MHz bandwidth transmission based on the preamble sequence.

When a receiving station detects the preamble for the 18 MHz transmission, the receiving station adjusts its receiving bandwidth from 20 MHz to 18 MHz and adjusts the 1 MHz frequency offset as needed. After receiving the beacon, if a receiving station decides to connect to the access point from which the beacon is transmitted, the receiving station will use the sub-channel indicated in the beacon frame for further communications with the access point.

In another implementation, for example, where a channel bandwidth is 10 MHz and the center frequency for each of two subchannels is offset 1 MHZ on either side of the center frequency of the channel, beacon transmissions have a bandwidth of 8 MHz. And so on.

Figure 6:
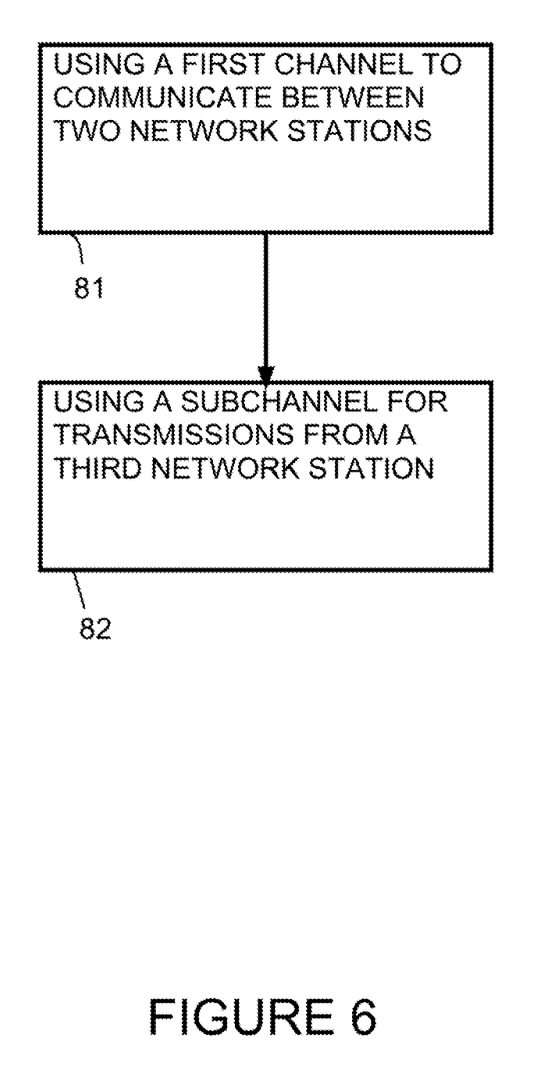
FIG. 6 is a simplified block diagram describing communication within a first channel and a subchannel in accordance with an embodiment.

As illustrated by a block 81 of FIG. 6, a first network station and a second network station use a first channel from a plurality of channels to communicate. In block 82, a sub-channel is used for transmissions from a third network station. The sub-channel overlaps the first channel. The sub-channel has a center frequency that varies sufficiently from a center frequency of the first channel so that the first network station and the second network station do not lock onto packets transmitted from the third network station. The center frequency of the sub-channel is closer in frequency to the center frequency of the first channel than to a center frequency of any other channel in the plurality of channels.

The disclosed subject matter may be implemented in other specific forms without departing from the spirit or characteristics thereof. Accordingly, the present disclosure is intended to be illustrative, but not limiting, of the scope of the following claims.

We claim:

1. A network station, comprising: a processor; and, a transceiver that sends and receives wireless communications, wherein the transceiver is arranged to communicate with a second network station on a sub-channel with a center frequency, the sub-channel being a sub-channel of a first Institute of Electrical and Electronics Engineers (IEEE) 802.11 channel from a plurality of IEEE 802.11 channels, the first channel having a central frequency, the sub-channel overlapping the first channel, the center frequency of the sub-channel being offset sufficiently from the center frequency of the first channel so that the network station and the second network station do not lock onto packets transmitted from a third network station transmitting in the first channel; wherein the center frequency of the sub-channel is closer in frequency to the center frequency of the first channel than to a center frequency of any other channel in the plurality of channels;

wherein the network station is an access point in a first local area wireless network and the third network station is a second access point in a second local area wireless network;

wherein the transceiver being arranged to send out a beacon signal with a center frequency at the center frequency of the first channel, so that when the second access point sends out a beacon signal with a center frequency at the center frequency of the first channel, the beacon signal sent out by the transceiver is completely within a bandwidth of the first channel and within a bandwidth of the sub-channel and the beacon signal sent out by the second access point is completely within the bandwidth of the first channel and within the bandwidth of the sub-channel;

wherein the beacon signal sent out by the transceiver includes a training sequence in a preamble that indicates the beacon signal sent out by the first access point has a smaller bandwidth than other transmissions from the first access point.

2. A network station as in claim 1 additionally comprising:
an IEEE 802.11 media access controller.

3. A network station as in claim 1 wherein:
the plurality of channels is a plurality of non-overlapping channels.

4. A network station as in claim 1 wherein:
the plurality of channels is a plurality of overlapping channels.

5. A method comprising:
using a first Institute of Electrical and Electronics Engineers (IEEE) 802.11 channel from a plurality of IEEE 802.11 channels to communicate between a first network station and a second network station, the first channel having a central frequency; and,
using a sub-channel for transmissions from a third network station, the sub-channel overlapping the first channel, the sub-channel having a center frequency that varies sufficiently from the center frequency of the first channel so that the first network station and the second network station do not lock onto packets transmitted from the third network station, wherein the center frequency of the sub-channel is closer in frequency to the center frequency of the first channel than to a center frequency of any other channel in the plurality of channel;
wherein using the first channel from the plurality of channels to communicate between a first network station and a second network station includes the first network station broadcasting a beacon signal with a center frequency at the center frequency of the first channel, wherein the beacon signal sent out by the first network station is completely within a bandwidth of the first channel and within a bandwidth of the sub-channel; and using the sub-channel for transmissions from the third network station includes the second network station broadcasting a beacon signal with a center frequency at the center frequency of the sub-channel, wherein the beacon signal sent out by the second network station is completely within the bandwidth of the first channel and within the bandwidth of the sub-channel;
wherein the beacon signal sent out by the first network station includes a preamble that indicates the beacon signal sent out by the first network station has a smaller bandwidth than other transmissions from the first network station; and the beacon signal sent out by the second network station includes a preamble that indicates the beacon signal sent out by the second network station has a smaller bandwidth than other transmissions from the second network station.

6. A method as in claim 5 wherein:
the plurality of channels is a plurality of non-overlapping channels.

7. A method as tin claim 5 wherein:
the plurality of channels is a plurality of overlapping channels.

8. A method as in claim 5 wherein the first network and the second network communicate in accordance with an IEEE 802.11 standard.

9. A method as in claim 5 wherein the first network station is an access point in a first local area wireless network and the third network station is an access point in a second local area wireless network.

\* \* \* \* \*